(12) United States Patent
Wu et al.

(10) Patent No.: US 12,539,786 B2
(45) Date of Patent: Feb. 3, 2026

(54) METHOD FOR DETERMINING REMAINING RANGE OF VEHICLE, COMPUTER DEVICE, AND COMPUTER-READABLE STORAGE MEDIUM

(71) Applicant: GREAT WALL MOTOR COMPANY LIMITED, Hebei (CN)

(72) Inventors: Maiqing Wu, Hebei (CN); Lei Li, Hebei (CN); Na Lu, Hebei (CN); Yang Hao, Hebei (CN); Mingwang Zhou, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 825 days.

(21) Appl. No.: 17/790,290

(22) PCT Filed: Apr. 28, 2021

(86) PCT No.: PCT/CN2021/090610
§ 371 (c)(1),
(2) Date: Jun. 30, 2022

(87) PCT Pub. No.: WO2021/219013
PCT Pub. Date: Nov. 4, 2021

(65) Prior Publication Data
US 2023/0034887 A1 Feb. 2, 2023

(30) Foreign Application Priority Data
Apr. 30, 2020 (CN) .......................... 202010367987.6

(51) Int. Cl.
*B60L 58/13* (2019.01)
*B60L 58/30* (2019.01)

(52) U.S. Cl.
CPC ............... *B60L 58/13* (2019.02); *B60L 58/30* (2019.02); *B60L 2240/12* (2013.01); *B60L 2260/52* (2013.01); *B60L 2260/54* (2013.01)

(58) Field of Classification Search
CPC ...... B60L 58/13; B60L 58/30; B60L 2240/12; B60L 2260/52; B60L 2260/54;
(Continued)

(56) References Cited

U.S. PATENT DOCUMENTS 8,594,918 B2 * 11/2013 Meyer-Ebeling ... B60L 15/2045
701/123
8,712,650 B2 * 4/2014 Koebler .................. B60L 58/16
340/995.13
(Continued)

FOREIGN PATENT DOCUMENTS

CN 102673406 A 9/2012
CN 104853947 A 8/2015
(Continued)

*Primary Examiner* — M Baye Diao
(74) *Attorney, Agent, or Firm* — Nath, Goldberg & Meyer; Joshua B. Goldberg

(57) ABSTRACT

A method for determining a remaining range of a vehicle, including: determining a remaining range of the vehicle driven depending on a current residual energy of a power battery, determining a remaining range of the vehicle driven depending on a current residual energy of a fuel cell, and determining a remaining range of the vehicle driven depending on a recuperated energy when an energy recuperation function of the vehicle is activated; and determining the remaining range of the vehicle based on the aforesaid remaining ranges of the vehicle. According to this method of the present disclosure, the remaining range of the vehicle may be accurately reflected, and it is more convenient for a user to schedule a vehicle trip.

15 Claims, 4 Drawing Sheets

(58) Field of Classification Search
CPC .......... B60L 2220/42; B60L 1/02; B60L 7/10;
B60L 50/75; B60L 58/12; B60L 58/40;
B60L 1/003; B60L 3/12; Y02T 10/70;
Y02T 90/40
USPC ........................................................ 320/134
See application file for complete search history.

(56) References Cited

U.S. PATENT DOCUMENTS

| | | | | |
|---|---|---|---|---|
| 8,930,125 | B2* | 1/2015 | Fasse | ............... B60L 50/30 |
| | | | | 701/123 |
| 9,043,068 | B2* | 5/2015 | Shiogai | ............. B60L 15/2045 |
| | | | | 701/22 |
| 9,630,504 | B2* | 4/2017 | Tseng | ................ B60L 50/16 |
| 9,662,996 | B2* | 5/2017 | Klimesch | ............ B60R 16/0236 |
| 10,189,463 | B2* | 1/2019 | Gutruf | ................. B60W 20/00 |
| 10,443,139 | B2* | 10/2019 | Mills | .................... H10F 10/161 |
| 10,467,824 | B2* | 11/2019 | Rosenbaum | ......... G07C 5/0808 |
| 10,696,165 | B2* | 6/2020 | Bennett | .............. B60L 15/2045 |
| 10,994,719 | B2* | 5/2021 | Obata | .................. B60W 20/00 |
| 11,227,452 | B2* | 1/2022 | Rosenbaum | ........... G07C 5/008 |
| 11,230,776 | B2* | 1/2022 | Mills | ....................... H05H 1/01 |
| 2005/0228553 | A1* | 10/2005 | Tryon | .................... B60L 50/16 |
| | | | | 701/22 |
| 2006/0121325 | A1* | 6/2006 | Beguery | ........... H01M 8/04425 |
| | | | | 429/444 |
| 2008/0027639 | A1* | 1/2008 | Tryon | ................ G01C 21/3617 |
| | | | | 701/533 |
| 2008/0051977 | A1* | 2/2008 | Tryon | ..................... B60L 50/16 |
| | | | | 701/103 |
| 2012/0239283 | A1 | 9/2012 | Fasse et al. | |
| 2017/0144647 | A1* | 5/2017 | Gutruf | .................. B60W 20/00 |
| 2018/0072157 | A1 | 3/2018 | Koebler et al. | |

FOREIGN PATENT DOCUMENTS

| | | |
|---|---|---|
| CN | 106740822 A | 5/2017 |
| CN | 108501750 A | 9/2018 |
| CN | 109278562 A | 1/2019 |
| CN | 109753697 A | 5/2019 |
| CN | 109849676 A | 6/2019 |
| CN | 110154790 A | 8/2019 |
| CN | 110341547 A | 10/2019 |
| CN | 110549915 A | 12/2019 |
| CN | 110861507 A | 3/2020 |
| CN | 112389213 A | 2/2021 |
| DE | 102013220480 A1 | 9/2014 |
| DE | 102016215003 A1 | 2/2018 |
| EP | 3575140 A1 | 12/2019 |
| JP | 2003230203 A | 8/2003 |
| KR | 20130129738 A | 11/2013 |

* cited by examiner

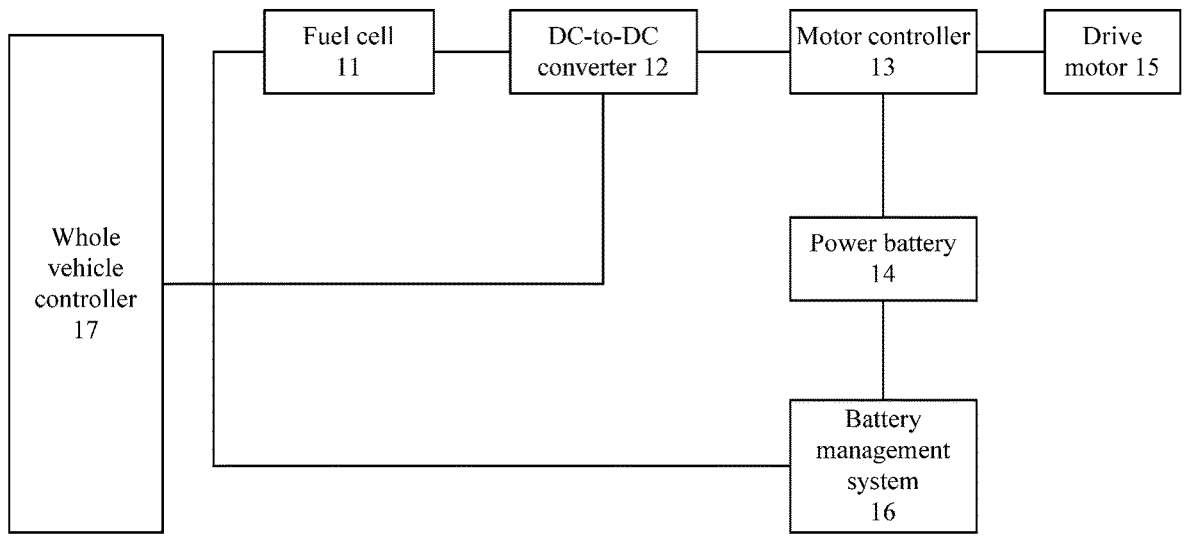

FIG. 1

```
Determining a remaining range of the vehicle driven based on a current remaining
energy of a power battery, determining a remaining range of the vehicle driven based
on a current remaining energy of a fuel cell, and determining a remaining range of the
vehicle driven based on an energy recycled when an energy recovery function of the
vehicle is activated
```
— S201

```
Determining the remaining range of the vehicle, based on the remaining range of the
vehicle driven depending on the current remaining energy of the power battery, the
remaining range of the vehicle driven depending on the current remaining energy of
the fuel cell of the vehicle, and the remaining range of the vehicle driven depending
on the recuperated energy when the energy recuperation function of the vehicle is
activated
```
— S202

FIG. 2

METHOD FOR DETERMINING REMAINING RANGE OF VEHICLE, COMPUTER DEVICE, AND COMPUTER-READABLE STORAGE MEDIUM

CROSS-REFERENCE TO RELATED APPLICATIONS

The present disclosure is a national stage of PCT international application No. PCT/CN2021/090610, filed on Apr. 28, 2021, which claims priority to Chinese patent application No. 202010367987.6 filed on Apr. 30, 2020 and entitled "method and apparatus for determining remaining range of vehicle, device, computer program and medium", the entire contents of which are incorporated herein by reference.

TECHNICAL FIELD

The present disclosure relates to the technical field of vehicles, and more particularly to a method for determining a remaining range of a vehicle, a computer device, and a computer-readable storage medium.

DESCRIPTION OF RELATED ART fuel cell vehicles refer to the vehicles that use gasoline, natural gas, methanol, methane, liquefied petroleum gas or hydrogen as fuel. According to the characteristics of fuels, the fuel cell vehicles are divided into a direct fuel cell vehicle that uses hydrogen as fuel and a reforming fuel cell vehicle that uses gasoline, natural gas, methanol, methane or liquefied petroleum gas as fuel. In the related art, it is customary to call the direct fuel cell electric vehicle as the fuel cell vehicle, that is, FCEV (Fuel Cell Electric Vehicle, abbreviated as FCEV hereinafter). The FCEV may be classified into a FCEV driven by a pure fuel cell, a FCEV driven by a fuel cell and power battery, and a FCEV driven by a fuel cell and a super capacitor according to different configurations of the multiple power supplies.

With regard to the FCEV driven by the fuel cell and the power battery, a remaining range of the FCEV is generally determined by calculating the remaining range of the vehicle under a pure electric drive mode; however, this method for determining the remaining range of the vehicle cannot reflect the remaining range of the whole vehicle accurately, so that it is not convenient for a user to schedule his/her vehicle trip.

SUMMARY

In view of this, one objective of the present disclosure is to propose a method for determining a remaining range of a vehicle, which aims at reflecting the remaining range of the vehicle accurately, and providing convenience for the user to schedule his/her vehicle trip.

In order to achieve this objective, the technical solutions of the present disclosure are implemented in this manner:

a method for determining a remaining range of a vehicle, including:

determining a remaining range of the vehicle driven depending on a current residual energy of a power battery, determining a remaining range of the vehicle driven depending on a current residual energy of a fuel cell, and determining a remaining range of the vehicle driven depending on a recuperated energy when an energy recuperation function of the vehicle is activated; and determining the remaining range of the vehicle, based on the remaining range of the vehicle driven depending on the current residual energy of the power battery, the remaining range of the vehicle driven depending on the current residual energy of the fuel cell of the vehicle, and the remaining range of the vehicle driven depending on the recuperated energy when the energy recuperation function of the vehicle is activated.

In one preferable embodiment, said determining the remaining range of the vehicle driven depending on the current residual energy of the power battery includes: obtaining a difference value between the current residual energy of the power battery of the vehicle and a reserved energy of a high-voltage electrical component of the vehicle; obtaining a first average vehicle speed and a first average driving power of the vehicle driven depending on the current residual energy of the power battery; obtaining a first consumed power of the high-voltage electrical component in a driving process of the vehicle driven depending on the current residual energy of the power battery; and determining the remaining range of the vehicle driven depending on the current residual energy of the power battery, based on the difference value, the first average vehicle speed, the first average driving power and the first consumed power of the high-voltage electrical component.

In one preferable embodiment, said obtaining the first average vehicle speed, the first average driving power, and the first consumed power includes: obtaining a preset number of first time durations and at least one of parameters in each of the preset number of first time durations according to the first average vehicle speed and the first average driving power of the vehicle and the first consumed power of the high-voltage electrical component, where the parameters include: a vehicle moving distance, a first ratio factor reflecting a condition of allocation of driving powers of the power battery and the fuel cell, an energy consumption of a first drive motor of the vehicle, and an energy consumption of the first high-voltage electrical component; determining the first average vehicle speed based on the preset number of first time durations, the travel distance of the vehicle, and the first ratio factor; determining the first average driving power based on the preset number of first time durations, the energy consumption of the first drive motor, and the first ratio factor; and determining the first consumed power based on the preset number of first time durations, the energy consumption of the first high-voltage electrical component, and the first ratio factor.

In one preferable embodiment, said determining the remaining range of the vehicle driven depending on the current residual energy of the power battery includes: obtaining a second ratio factor reflecting the condition of allocation of the driving powers of the power battery and the fuel cell currently; and determining the remaining range of the vehicle driven depending on the current residual energy of the power battery according to a formula expressed as:

$$\text{the remaining range of the vehicle driven depending on the current residual energy} = \frac{\text{the difference value} * \text{the first average vehicle speed}}{\text{the second ratio factor} * \text{the first average driving power} + \text{the first comsumed power}}.$$

In one preferable embodiment, said determining the remaining range of the vehicle driven depending on the current residual energy of the fuel cell of the vehicle includes: obtaining the current residual energy of the fuel cell, wherein the current residual energy of the fuel cell is configured to be associated with a weight of a fuel of the vehicle; obtaining an average fuel loss of the vehicle; and determining the remaining range of the vehicle driven depending on the current residual energy of the fuel cell, based on the current residual energy and the average fuel loss of the vehicle.

In one preferable embodiment, said determining the remaining range of the vehicle driven depending on the recuperated energy when the energy recuperation function of the vehicle is activated includes: obtaining the recuperated energy when the energy recuperation function of the vehicle is activated; obtaining a second average vehicle speed and a second average driving power of the vehicle driven depending on the recuperated energy when the energy recuperation function of the vehicle is activated; obtaining a second consumed power of the high-voltage electrical component of the vehicle in a driving process of vehicle driven depending on the recuperated energy when the energy recuperation function of the vehicle is activated; and determining the remaining range of the vehicle driven depending on the recuperated energy when the energy recuperation function of the vehicle is activated, based on the recuperated energy when the energy recuperation function of the vehicle is activated, the second average vehicle speed, the second average driving power and the second consumed power of the high-voltage electrical component.

In one preferable embodiment, said determining the second average driving power and the second consumed power when the energy recuperation function is activated includes: obtaining a preset number of second time durations and at least one of parameters in each of the preset number of second time durations according to the second average driving power of the vehicle and the second consumed power of the high-voltage electrical component, where the parameters include: a third ratio factor reflecting a condition of allocation of driving powers of the power battery and the fuel cell, an energy consumption of a second drive motor of the vehicle, and an energy consumption of a second high-voltage electrical component; determining the second average driving power based on the preset number of second time durations, the energy consumption of the second drive motor, and the third ratio factor; and determining the second consumed power based on the preset number of second time durations, the energy consumption of the second high-voltage electrical component, and the third ratio factor.

In one preferable embodiment, the method for determining the remaining range of the vehicle further includes: obtaining a performance-related parameter of the power battery and/or the fuel cell; determining an attenuation rate of the power battery and/or the fuel cell when the performance-related parameter indicates that a performance of the power battery and/or the fuel cell is degraded; and determining the remaining range of the vehicle, based on the remaining range of the vehicle driven depending on the current residual energy of the power battery, the remaining range of the vehicle driven depending on the current residual energy of the fuel cell of the vehicle, and the remaining range of the vehicle driven depending on the recuperated energy when the energy recuperation function of the vehicle is activated, and the attenuation rate.

Compared with the related art, the method for determining the remaining range of the vehicle according to the present disclosure has the following advantages:

the remaining range of the vehicle driven depending on the current residual energy of the power battery, the remaining range of the vehicle driven depending on the current residual energy of the fuel cell, and the remaining range of the vehicle driven depending on the recuperated energy when the vehicle recovery function of the vehicle is activated are obtained. The total remaining range of the vehicle is determined based on the aforesaid three types of energies; compared with the existing method for determining the remaining range, there are more reference factors in the present disclosure, so that the method for determining the remaining range of the vehicle disclosed in the present disclosure has a higher accuracy in the determination of the remaining range of the vehicle.

Furthermore, a computer device is further provided in the present disclosure, the computer device includes:

a memory which stores a computer readable program code; and one or a plurality of processors, where when the computer readable program code is executed by the one or plurality of processors, the computer device is configured to perform the method for determining the remaining range of the vehicle in the present disclosure.

A computer program is further provided in the present disclosure, the computer program includes a computer-readable program code, that, when executed by a computer device, causes the computer device to perform the method for determining the remaining range of the vehicle in the present disclosure.

A computer-readable storage medium is further provided in the present disclosure, the computer-readable storage medium stores a computer program, that, when executed by the computer device, causes the computer device to implement the method for determining the remaining range of the vehicle.

Other features and advantages of the present disclosure will be described in detail with reference to the detailed description of embodiments hereinafter.

BRIEF DESCRIPTION OF THE DRAWINGS

The accompanying figures that constitute a part of the present disclosure are used to provide further interpretation of the present disclosure, the exemplified implementations and the explanations of the exemplified implementations are intended to explain the present disclosure, rather than being constituted as inappropriate limitation to the present disclosure. In the figures:

FIG. 1 illustrates a modular block diagram of a FCEV driven by a fuel cell in combination with a power battery according to one embodiment of the present disclosure;

FIG. 2 illustrates a schematic flowchart of a method for determining a remaining range of a vehicle according to one embodiment of the present disclosure;

REFERENCE NUMERALS ARE LISTED BELOW

Figure 3:
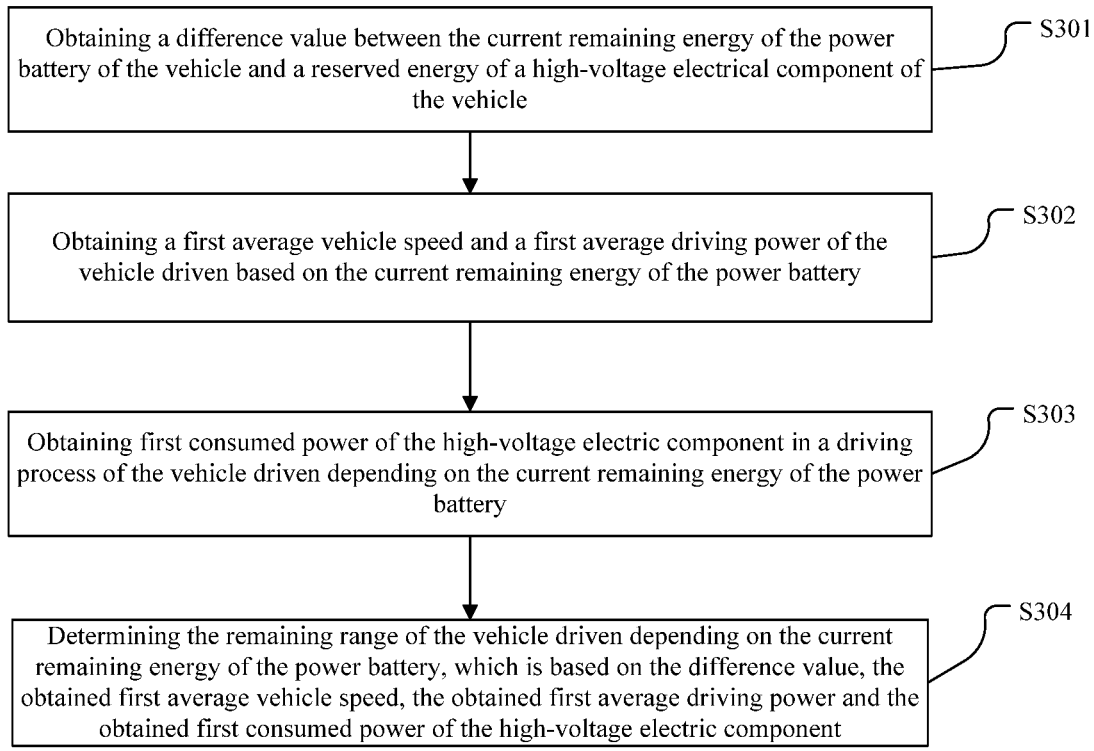
FIG. 3 illustrates a schematic diagram of determination of a remaining range of a vehicle driven depending on a current residual energy of a power battery according to one embodiment of the present disclosure.

11—Fuel cell; 12—DC—to—DC converter; 13—motor controller; 14—power battery; 15—drive motor; 16—battery management system; 17—whole vehicle controller.

DETAILED DESCRIPTION OF EMBODIMENTS

It should be noted that, in the case of no conflict, the embodiments of the present disclosure and the features in the embodiments may be in combination with each other.

A vehicle's remaining range is used to reflect a distance that the vehicle can continue to move in the current state. At present, the remaining range of the vehicle is a determination of a remaining range in a pure electric driving mode, however, the remaining range of the vehicle driven under the pure electric driving mode cannot reflect the mileage that the vehicle can reach accurately, for example, a remaining range of the vehicle driven depending on a residual energy of a fuel cell system and a remaining range of the vehicle driven depending on the recuperated energy when the energy recuperation function of the vehicle is activated are not considered in the prior art. Various influence factors of remaining range will be considered in the present disclosure, so that the remaining range of the vehicle can be obtained more accurately. The fuel cell system includes a fuel cell body, a fuel storage, a fuel supply system, a fuel cell controller, and the like, the present disclosure will be described in detail by simply abbreviating the fuel cell system as the fuel cell below.

The present disclosure is mainly directed to vehicle types of FCEV driven by the fuel cell in combination with a power battery. FIG. 1 illustrates a schematic block diagram of a vehicle model of FCEV driven by the fuel cell with the combination of the power battery. As shown in FIG. 1, the FCEV model is mainly composed of a fuel cell 11, a power battery 14, a battery management system 16, a motor controller 13, a DC-to-DC converter 12, a drive motor 15, and a vehicle controller 17. Where, the power battery 14 and the fuel cell 11 are electrically connected to the motor controller 13 to control the operation of the drive motor 15, thereby driving the vehicle to travel.

FIG. 2 illustrates a schematic flowchart of a method for determining a remaining range of a vehicle according to the present disclosure, as shown in FIG. 2, the method for determining the remaining range of the vehicle includes:

At step S201, a remaining range of the vehicle driven depending on a current residual energy of the power battery, a remaining range of the vehicle driven depending on a current residual energy of the fuel cell, and a remaining range of the vehicle driven depending on a recuperated energy when the energy recuperation function is activated are determined.

Where, the current residual energy of the power battery may be obtained through the battery management system, the battery management system communicates with the power battery and obtains the current residual energy of the power battery. The current residual energy of the fuel cell is obtained by a fuel cell controller, where the fuel cell controller is used to manage the energy of the fuel cell and control the use of the fuel cell. Due to the fact that the vehicle may charge the power battery when the energy recuperation function is activated, the recuperated energy when the energy recuperation function of the vehicle is activated may also be obtained through the battery management system.

At step S202, the remaining range of the vehicle is determined based on the remaining range of the vehicle driven depending on the current residual energy of the power battery, the remaining range of the vehicle driven depending on the current residual energy of the fuel cell, and the remaining range of the vehicle driven depending on the recuperated energy when the energy recuperation function is activated.

The remaining range of the vehicle is associated with the three energy parameters obtained in the step S201, in particular, the remaining range of the vehicle is the summation of the three remaining ranges obtained in the step S201.

Acquisition of the remaining range of the vehicle driven depending on the current residual energy of the power battery, acquisition of the remaining range of the vehicle driven depending on the current residual energy of the fuel cell, and acquisition of the remaining range of the vehicle driven depending on the recuperated energy when the energy recuperation function is activated are respectively described below with reference to the plurality of accompanying drawings.

FIG. 3 illustrates a schematic flowchart of determination of a remaining range of a vehicle driven depending on a current residual energy of a power battery.

The determination of the remaining range of the vehicle driven depending on the current residual energy of the power battery includes:

at step 301, a difference value between the current residual energy of the power battery of the vehicle and a reserved energy of a high-voltage electrical component of the vehicle is determined.

Where the reserved energy refers to the energy that is not available to the power battery, and the reserved energy is used to enable the power battery to be self-heated and enable the high-voltage electrical component of the vehicle to work normally, the high-voltage electrical component may be an air compressor.

At step S302, a first average vehicle speed $SP_{veh_{avg}}(Batt)$ and a first average driving power $P_{drv\_avg}(Batt)$ of the vehicle driven depending on the current residual energy of the power battery are obtained.

The first average vehicle speed $SP_{veh_{avg}}(Batt)$ and/or the first average driving power $P_{drv\_avg}(Batt)$ may be obtained directly from historical data relating to vehicle driving, the first average vehicle speed $SP_{veh_{avg}}(Batt)$ and/or the first average driving power $P_{drv\_avg}(Batt)$ may also be calculated in a further preferable manner listed below:

A method for determining the first average vehicle speed $P_{drv\_avg}(Batt)$ is as follows: a preset number of latest first time durations T and parameters in each of the first time durations T are obtained, where the parameters includes: a vehicle driving distance R, a first ratio factor K that reflects a condition of allocation of driving powers of the power battery and the fuel cell; the recent preset number is three preset time durations closest to the current time by taking the current time as the basis, and the first average vehicle speed is determined based on the first time durations T, the vehicle travel distance R in each of the first time durations T, and the first ratio factor K in each of the first time durations T. Herein, taking the preset number as 3 as an example, that is, the obtained latest first time durations are three time periods of T1, T2 and T3, respectively, where T1, T2 and T3 may be assigned as 1 minute, the vehicle driving distances in the three time periods T1, T2 and T3 are represented as R1, R2 and R3 respectively, and the first ratio factors in the three time periods T1, R2 and T3 are represented as K1, K2 and K3, respectively; so that a formula of determining the first average vehicle speed is expressed as:

$$SP_{veh_{avg}}(Batt) = \frac{K1*R1 + K2*R2 + K3*R3}{K1*T1 + K2*T2 + K3*T3};$$

Where the vehicle driving distance may be determined according to the following formula expressed as:

$Rx = \int vdt,$

Where, said v represent a speed of the vehicle driving in one direction, said Rx represents a driving distance of R1, R2 or R3 of the vehicle.

A method for determining the first average driving power $P_{drv\_avg}$(Batt) is as follows: the recent preset number of first time durations T and the parameters in each of the first time periods T are determined; where the parameters include an energy consumption E of a drive motor, a first ratio factor K that reflects a condition of allocation of driving powers of the power battery and the fuel cell; and the first average driving power $P_{drv\_avg}$(Batt) of the vehicle is determined based on the first time durations T, the energy consumptions E of the drive motor in the first time durations T, and the first ratio factor K. What is the same as the method for determining the first average vehicle speed in the method for determining the first average driving power $P_{drv\_avg}$(Batt) is that the preset number is taken as 3 as the example, that is, the obtained latest first time durations are T1, T2, and T3, respectively, where T1, T2 and T3 may be assigned as 1 minute, energy consumptions of the drive motor in the three time periods of T1, T2 and T3 is represented as K1, K2, and K3, respectively, and the first ratio factors in the three time periods of T1, T2 and T3 are represented as K1, K2 and K3 respectively, so that a formula of determining the first average driving power $P_{drv\_avg}$(Batt) is expressed as:

$$Pdrv_{avg(Batt)} = \frac{K1*E1 + K2*E2 + K3*E3}{K1*T1 + K2*T2 + K3*T3}$$

Where the energy consumption of the drive motor may be calculated through the following formula expressed as:

$Ex = \int Idt*V;$

Where, said I represents a driving current of the drive motor in the three time periods T1, T2, T3, respectively, said V represents a driving voltage of the drive motor in the three time periods T1, T2, T3, respectively At step S303, a first consumed power $P_{Aux}$ of a high-voltage electrical component of the vehicle during a driving process of the vehicle driven depending on the current residual energy of the power battery is determined.

In one preferable embodiment, the high-voltage electrical component is taken as an air conditioner as an example, said obtaining the first consumed power $P_{Aux}$ of the high-voltage electrical component of the vehicle during a driving process of the vehicle driven depending on the current residual energy of the power battery includes:

A preset number of latest first time durations, energy consumptions of the air conditioner in the first time durations and first ratio factors reflecting a condition of allocation of driving powers of the power battery and the fuel cell in the first time durations are determined; and a first consumed power of the high-voltage electrical component of the vehicle is determined based on the first time durations, the energy consumption of the air conditioner in each of the first time durations, and the first ratio factors in the first time durations. Taking the preset number as 3 as an example, that is, the obtained first time durations closest to the current time are three time periods of T1, T2, and T3, respectively, where T1, T2 and T3 may be assigned as 1 minute, the energy consumptions of the air conditioner in the three time periods of T1, T2 and T3 are represented as K1, K2, and K3, respectively, so that a formula of determining the first consumed power $P_{AC\_avg}$ is expressed as:

$$P_{AC\_avg} = \frac{K1*E_{ac1} + K2*E_{ac2} + K3*E_{ac3}}{K1*T1 + K2*T2 + K3*T3}$$

where $P_{AC\_avg}$ represents the average consumed power of the air conditioner. Furthermore, $E_{ACX} = \int(E_{AC\_input\_current})dt*E_{AC\_input\_voltage};$ Where $E_{AC\_input\_current}$ represents an input current of the air conditioner, $E_{AC\_input\_voltage}$ represents an input voltage of the air conditioner.

Furthermore, the high-voltage electrical component of the vehicle may include: the air conditioner, a DC-to-DC converter, a boost DC (Direct Current) converter, and an air compressor. When the air conditioner is turned off, a formula for determining the first consumed power $P_{Aux}$ is expressed as $P_{Aux} = P_{LV\_avg} + P_{FCS\_avg}$. When the air conditioner is turned on, a formula for determining the first consumed power $P_{Aux}$ is expressed as $P_{Aux} = P_{LV\_avg} + P_{FCS\_avg} + P_{AC\_avg}$.

Where, said $P_{FCS\_avg}$ represents the consumed power of the boost DC converter and the air compressor, $P_{LV\_avg}$ represents the consumed power of the DC-to-DC converter. The method for calculating the consumed power of the boost DC converter and the air compressor is the same as the method for calculating the consumed power of the air conditioner, and the two methods are described below:

$$P_{LV_{avg}} = \frac{k1*E_{DC1} + k2*E_{DC2} + k3*E_{DC3}}{k1*t1 + k2*t2 + k3*t3};$$

$$P_{FCS_{avg}} = \frac{K1*E_{FCS1} + k2*E_{FCS2} + k3*E_{FCS3}}{k1*t1 + k2*t2 + k3*t3};$$

Where $E_{DC1}$, $E_{DC2}$ and $E_{DC3}$ represent the energy consumption of the DC-to-DC converter in the three time periods of T1, T2, and T3, respectively; and $E_{FCS1}$, $E_{FCS2}$ and $E_{FCS3}$ represent the energy consumption of the boost DC converter and the air compressor in three time periods of T1, T2 and T3, respectively.

After $P_{LV\_avg}$, $P_{FCS\_avg}$ and $P_{AC\_avg}$ are determined, the first consumed power $P_{Aux}$ may be calculated through the summation of the $P_{LV\_avg}$, $P_{FCS\_avg}$ and $P_{AC\_avg}$.

At step S304, the remaining range of the vehicle driven depending on the residual energy of the power battery are determined based on the difference value, and the first average vehicle speed, the first average driving power and the first consumed power of the high-voltage electrical component.

Where, said difference value is the difference value between the current residual energy of the power battery of the vehicle and the reserved energy of the high-voltage electrical component of the vehicle.

In one preferable embodiment, the method for determining the remaining range of the vehicle driven depending on the current residual energy of the power battery may include:

a second ratio factor that currently reflects a condition of allocation of driving powers of the power battery and the fuel cell are determined, where the time when the second ratio factor is determined is different from the time when the first ratio factor is determined.

The remaining range of the vehicle driven depending on the current residual energy of the power battery is determined through a formula expressed as:

$$\text{Remaining Range (Batt)} = \frac{\text{Remain Energy (Batt)} * SP_{veh\_avg}}{N_1 * P_{drv\_avg} + P_{Aux}};$$

Where, said remaining Range (Batt) represents the remaining range of the vehicle driven depending on the current residual energy of the power battery of the vehicle, and the remaining Range (Batt) is determined according to the step S301, said $SP_{veh\_avg}$, $P_{drv\_avg}$ are determined according to the step S302, said $N_1$ represents the second ratio factor, and said $P_{Aux}$ is determined according to the step S303.

The remaining range of the vehicle driven according to the present disclosure based on the current residual energy of the power battery according to the present disclosure may be determined according to all these steps described above.

Figure 4:
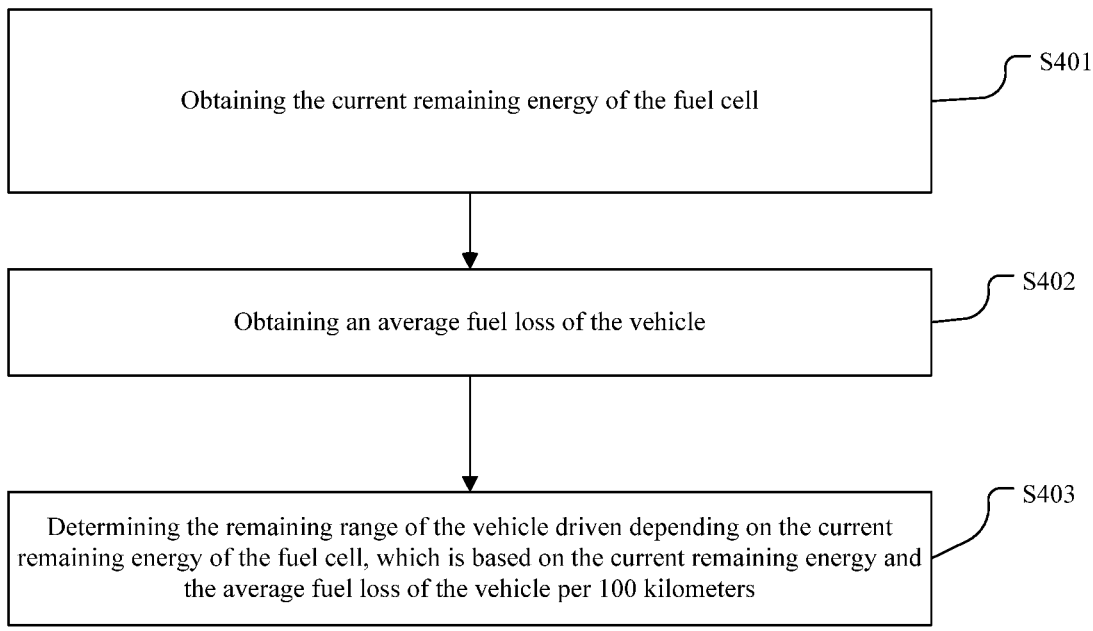
FIG. 4 illustrates a schematic diagram of determination of a remaining range of a vehicle driven depending on a current residual energy of a fuel cell of the vehicle according to one embodiment of the present disclosure.

FIG. 4 illustrates a schematic flowchart of a method for determining a remaining range of a vehicle driven depending on a current residual energy of a fuel cell of the vehicle according to the present disclosure, as shown in FIG. 4, the method includes:

At step 401, the current residual energy of the fuel cell is determined.

Where hydrogen fuel is taken as the fuel cell an example in this embodiment, the current residual energy of the fuel cell is configured to be associated with a weight of the hydrogen. The current residual energy of the fuel cell is proportional to the weight of the hydrogen, that is, the heavier the weight of the hydrogen, the more the current residual energy.

At step 402, an average fuel loss of the vehicle is determined.

The average fuel loss of the vehicle may be directly obtained from a fuel cell controller. The average fuel loss is actually a fuel consumption condition of the vehicle in the latest time duration, which can be such as a mean value of fuel losses per hundred kilometers in the recent hundred kilometers or thousand kilometers.

At step S403, the remaining range of the vehicle driving depending on the current residual energy of the fuel cell is determined based on the current residual energy and the fuel loss per hundred kilometers.

Where the remaining range of the vehicle driven depending on the current residual energy of the fuel cell is determined through a formula listed below:

$$\text{the remaining range of the vehicle driven depending on the current residual energy of the fuel cell} = \frac{\text{the residual energy of the fuel cell}}{\text{the fuel loss of the vehicle per one hundred kilometers}}.$$

Figure 5:
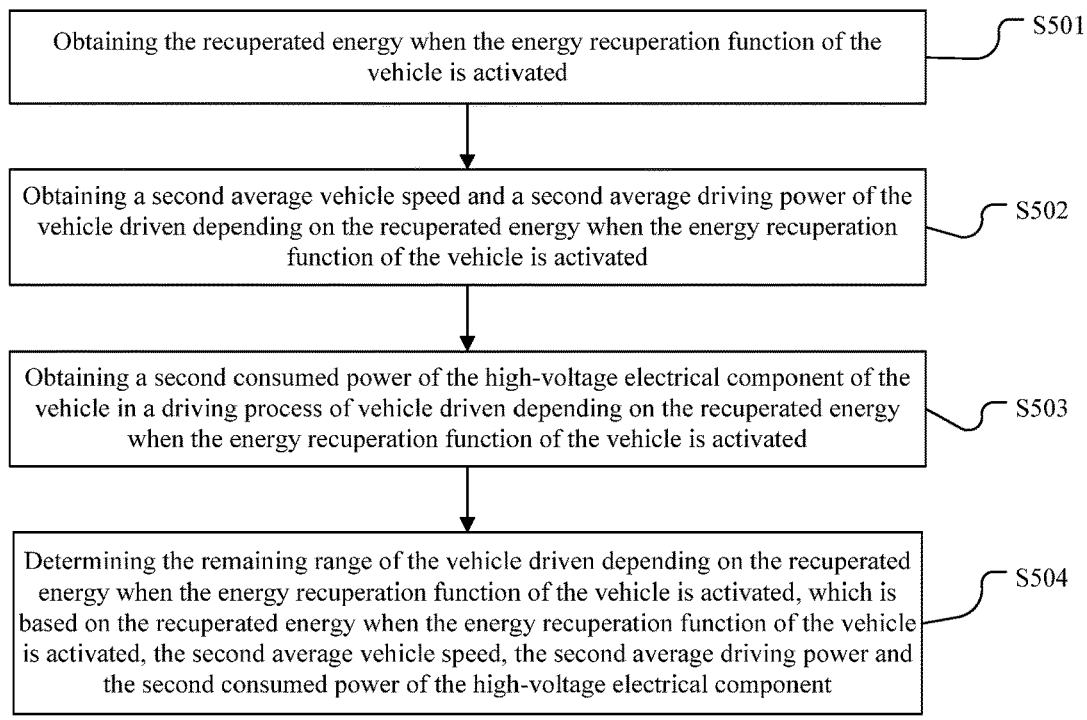
FIG. 5 illustrates a schematic diagram of determination of a remaining range of a vehicle driven depending on a recuperated energy when a power recovery function of the vehicle is activated according to one embodiment of the present disclosure.

FIG. 5 illustrates a schematic flowchart of a method for determining a remaining range of a vehicle driven depending on a recuperated energy when an energy recuperation function of the vehicle is activated according to the present disclosure, as shown in FIG. 5, this method includes:

At step S501, the recuperated energy when an energy recuperation function of the vehicle is activated is obtained.

Where the recuperated energy may be directly obtained from the battery management system.

At step S502, a second average vehicle speed $SP_{veg\_avg}(ER)$ and a second average driving power $P_{drv\_avg}(ER)$ of the vehicle driven depending on the recuperated energy when the energy recuperation function of the vehicle is activated are obtained.

The second average vehicle speed $SP_{veg\_avg}(ER)$ and/or the second average driving power $P_{drv\_avg}(ER)$ of the vehicle may either be obtained based on the latest history data about vehicle driving, or be estimated according to the driving condition. In this embodiment, a method of determining the second average vehicle speed $SP_{veg\_avg}(ER)$ and/or the second average driving power $P_{drv\_avg}(ER)$ will be further described by analyzing the historical data about vehicle driving.

Where the method for determining the second average vehicle speed $P_{drv\_avg}(ER)$ is the same as the method for obtaining the first average vehicle speed, the difference between the two methods is that the second average vehicle speed $P_{drv\_avg}(ER)$ is the data collected when the energy recuperation function of the vehicle is activated. The method for determining the second average driving power of the vehicle driven depending on the recuperated energy when the energy recuperation function of the vehicle is activated includes: obtaining a preset number of latest second time durations t and parameters in each of the second time durations t, the parameters include energy consumption of the drive motor (which is actually the energy consumption of the second drive motor) and a third ratio factor reflecting a condition of allocation of driving powers of a power battery and a fuel cell; and the second average driving power $P_{drv\_avg}(ER)$ of the vehicle when the energy recuperation function is activated, which is determined based on the second time durations t, the energy consumption of the drive motor in each of the second time durations t, and the third ratio factor. Where the second time durations are different from the first time durations because they are obtained at different time, the second time durations are obtained when the energy recuperation function of the vehicle is activated; taking the preset number as 3 as an example, the obtained latest second time durations t are time periods of T1, T2, and T3, respectively, where T1, T2, and T3 may be assigned as 1 minute, energy consumptions of the drive motor in the time periods of T1, T2, and T3 are $E_{ER1}$, $E_{ER2}$ and $E_{ER3}$, third ratio factors in the three time periods of T1, T2 and T3 are K1, K2 and K3 respectively, so that a formula of determining the second average driving power $P_{drv\_avg}(ER)$ is expressed as follows:

$$P_{drv_{avg}}(ER) = \frac{k1 * E_{ER1} + k2 * E_{ER2} + k3 * E_{ER3}}{k1 * t1 + k2 * t2 + k3 * t3}.$$

Where the energy consumption of the drive motor may be calculated using the following formula expressed as:

$$E_{ERX} = \int I(ER)dt * V(ER);$$

Where, said I(ER) represents the driving current of the drive motor in the three time periods T1, T2 and T3, said V(ER) represents driving voltages of the drive motor in the three time periods T1, T2 and T3.

At step S503, a second consumed power of the high-voltage electrical component of the vehicle in a driving process of the vehicle driven when the energy recuperation function of the vehicle is activated is obtained.

Where the second consumed power may be estimated according to historical data, in this embodiment, the DC-to-DC converter is taken as an example, the second consumed power is determined by using the method described below:

a preset number of latest second time durations and parameters in each of the second time durations are obtained, the parameters include: energy consumption of the DC-to-DC converter and a third ratio factor reflecting a condition of allocation of driving powers of the power battery and the fuel cell; and a second consumed power of the DC-to-C converter when the energy recuperation function is activated which is determined based on the second time durations, the energy consumptions of the DC converter in the second time durations, and the third ratio factor. Taking the preset number as 3 as an example, that is, the obtained latest second time durations are three time periods of T1, T2, and T3, respectively, where T1, T2 and T3 may be assigned as 1 minute, the energy consumptions of the DC-to-DC converter in the three time periods of T1, T2, and T3 are K1, K2 and K3 respectively, and the formula for determining the consumed power of the DC-to-DC converter is expressed as:

$$P_{LV_{avg}(ER)} = \frac{k1 * E_{DC1}(ER) + k2 * E_{DC2}(ER) + k3 * E_{DC3}(ER)}{k1 * t1 + k2 * t2 + k3 * t3};$$

Where, said $P_{LV_{avg(ER)}}$ represents the average consumed power of the DC-to-DC converter when the energy recuperation function is activated. Furthermore, $$E_{DCx} = \int (E_{DC\_input\_current}) dt * E_{DC\_input\_voltage};$$

Where, said $E_{DC\_input\_current}$ represents a current of the DC-to-DC converter, $E_{DC\_input\_voltage}$ represents a voltage of the DC-to-DC converter.

Furthermore, what is the same as a non-energy recuperation condition is that the high-voltage electrical component of the vehicle may include: an air conditioner, a DC-to-DC converter, a boost DC converter, and an air compressor. The method for calculating the second consumed power is determined according to turning on and turning off of the air conditioner. When the air conditioner is turned off, $P_{Aux}(ER) = P_{LV\_avg}(ER) + P_{FCS\_avg}(ER)$; When the air conditioner is turned on, $P_{Aux}(ER) = P_{LV\_avg}(ER) + P_{FCS\_avg}(ER) + P_{AC\_avg}(ER)$. Where, said $P_{Aux}(ER)$ represents the second consumed power, said $P_{FCS\_avg}(ER)$ represents the consumed power of the boost DC converter and the air compressor when the energy recuperation function is activated, and said $P_{AC\_avg}(ER)$ represents the consumed power when the energy recuperation function is activated and the air conditioner is turned on. Where the method for calculating the consumed power of the boost DC converter and the air compressor, and the method for calculating the consumed power of the air conditioner are basically the same as the method for calculating the consumed power of the DC-to-DC converter; in particular, the method for calculating the $P_{AC\_avg}(ER)$ and the method for calculating the $P_{FCS\_avg}(ER)$ are expressed below:

$$P_{AC_{avg}}(ER) = \frac{k1 * E_{ac1}(ER) + k2 * E_{ac2}(ER) + k3 * E_{ac3}(ER)}{k1 * t1 + k2 * t2 + k2 * t3};$$

$$P_{FCS_{avg}}(ER) = \frac{k1 * E_{FCS1}(ER) + k2 * E_{FCS2}(ER) + k3 * E_{FCS3}(ER)}{k1 * t1 + k2 * t2 + k3 * t3};$$

Where $E_{ac1}(ER)$, $E_{ac2}(ER)$ and $E_{ac3}(ER)$ represent the energy consumptions of the air conditioner in the three time periods of T1, T2 and T3; $E_{FCS1}$, $E_{FCS2}(ER)$ and $E_{FCS3}(ER)$ represent the energy consumptions of the boost DC converter and the air compressor in the three time periods of T1, T2, and T3 when the energy recuperation function is activated.

After $P_{LV_{avg}}(ER)$, $P_{FCS_{avg}}(ER)$ and $P_{AC\_avg}(ER)$ are obtained, the second consumed power can be determined by calculating the summation of the $P_{LV_{avg}}(ER)$, $P_{FCS_{avg}}(ER)$ and $P_{AC\_avg}(ER)$.

At step S504, the remaining range of the vehicle driven depending on the recuperated energy when the energy recuperation function of the vehicle is activated is determined, based on the recuperated energy when the energy recuperation function of the vehicle is activated, and the obtained second average vehicle speed, the obtained second average driving power and the obtained second consumed power of the high-voltage electrical component.

In particular, the remaining range of the vehicle driven depending on the recuperated energy when the energy recuperation function of the vehicle is activated is determined using a formula listed below:

$$\text{Remaining Range } (ER) = \frac{\text{Recuperation Energy} * SP_{veh\_avg}(ER)}{P_{drv\_avg}(ER) + P_{Aux}(ER)};$$

Where, said Remaining Range(ER) represents the recuperated energy of the vehicle when the energy recuperation function of the vehicle is activated; said RecuperationEnergy represent an energy of the power battery used for electric drive when the energy recuperation function is activated; said $SP_{veh_{avg}}(ER)$ represents the second average vehicle speed when the energy recuperation function is activated; said $P_{drv\_avg}(ER)$ represents the second average driving power when the energy recuperation function is activated; and said $P_{Aux}(ER)$ represents the second consumed power of the high-voltage electrical component when the energy recuperation function is activated.

The remaining range of the vehicle can be calculated according to the aforesaid method, the remaining range of the vehicle is composed of three parts including the remaining range of the power battery, the remaining range of the fuel cell, and the increased remaining range of the recuperated energy. The remaining range of the vehicle is obtained by calculating the summation of the remaining range of the power battery, the remaining range of the fuel cell and the increased remaining range of the recuperated energy. According to this method for determining the remaining range of the vehicle, not only an intuitive remaining range of vehicle is provided to the user to facilitate the user's travel, a reminder of filling fuel timely or charging can also be provided to the user, the fuel may be hydrogen, or the like.

Figure 6:
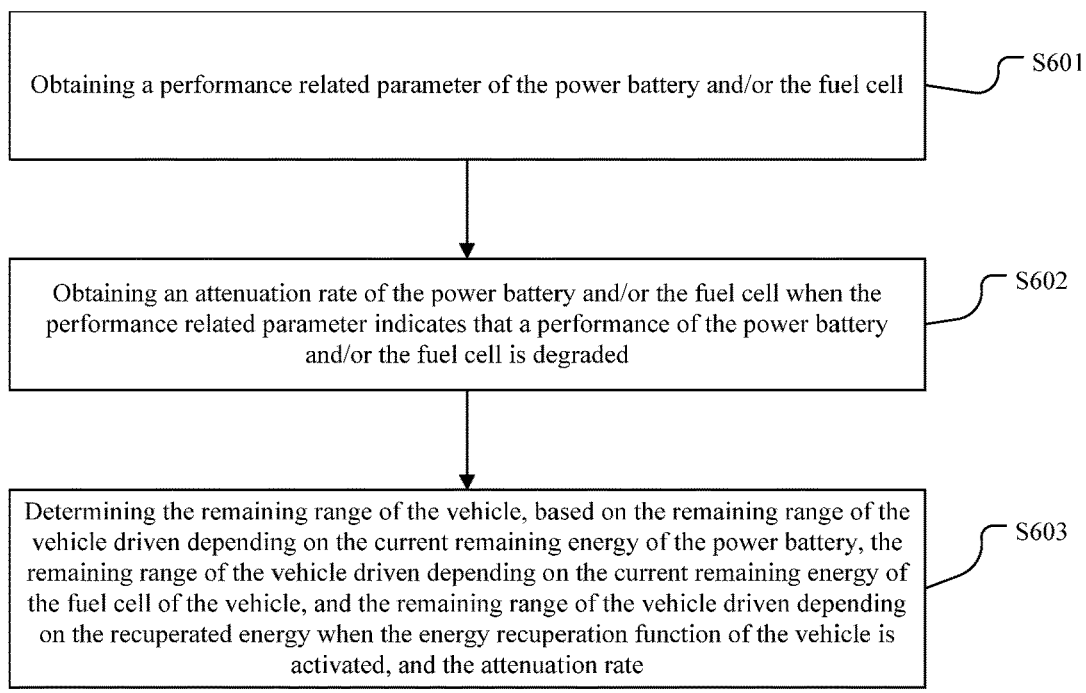
FIG. 6 illustrates a schematic flowchart of another method for determining the remaining range of the vehicle according to another embodiment of the present disclosure.

FIG. 6 illustrates a flowchart of another embodiment of the present disclosure, as shown in FIG. 6, after said obtaining the remaining range of the vehicle driven depending on the current residual energy of the power battery, the remaining range of the vehicle driven depending on the current residual energy of the fuel cell, and the remaining range of the vehicle driven depending on the recuperated energy when the energy recuperation function of the vehicle is activated, the method for determining the remaining range of the vehicle further includes:

At step s601, a performance-related parameter of the power battery and/or the fuel cell are obtained.

Where the performance-related parameter may include a change in an output power of the power battery and/or the fuel cell.

At step S602, when the performance-related parameter indicates that the performance of the power battery and/or the fuel cell is decreased, an attenuation rate of the power battery and/or the fuel cell is determined.

The attenuation rate may be determined according to actual conditions, and make proportional changes with the performance-related parameter, the greater the reduction of the performance of the power battery and/or the fuel cell, the greater the reduction of the attenuation rate of the power battery and/or the fuel cell. For example, output power is taken as an example, if the output power is equal to 50% of a target power, the attenuation rate may be set as 50% corresponding to the output power.

At step S603, the remaining range of the vehicle is determined depending on the remaining range of the vehicle driven depending on the current residual energy of the power battery, the remaining range of the vehicle driven depending on the current residual energy of the fuel cell, and the remaining range of the vehicle driven depending on the recuperated energy when the energy recuperation function of the vehicle is activated, and the attenuation rate.

In the process of actually determining the remaining range of the vehicle, the aforesaid three remaining ranges and the attenuation rate are multiplied to obtain the remaining range of the vehicle, so that the accuracy of determination of the remaining range of the vehicle is ensured.

In order to implement the aforesaid embodiments, a computer device 800 is further proposed in the present disclosure, the computer device includes a memory 830 and one or a plurality of processors 810.

The memory 830 stores a computer-readable program code, that, when executed by the one or plurality of processors 810, causes the computer device 800 to perform the method for determining the remaining range of the vehicle as described above.

In order to implement the aforesaid embodiments, a computer program 851 is further proposed in the present disclosure, the computer program 851 stores the computer-readable program code, that, when executed by the computer device 800, causes the computer device 800 to perform the method for determining the remaining range of the vehicle as described above.

In order to implement the aforesaid embodiments, a computer-readable storage medium is further proposed in the present disclosure, where the computer-readable storage medium stores the computer-readable program code, that, when executed by the computer device 800, causes the computer device 800 to perform the method for determining the remaining range of the vehicle as described above.

Figure 7:
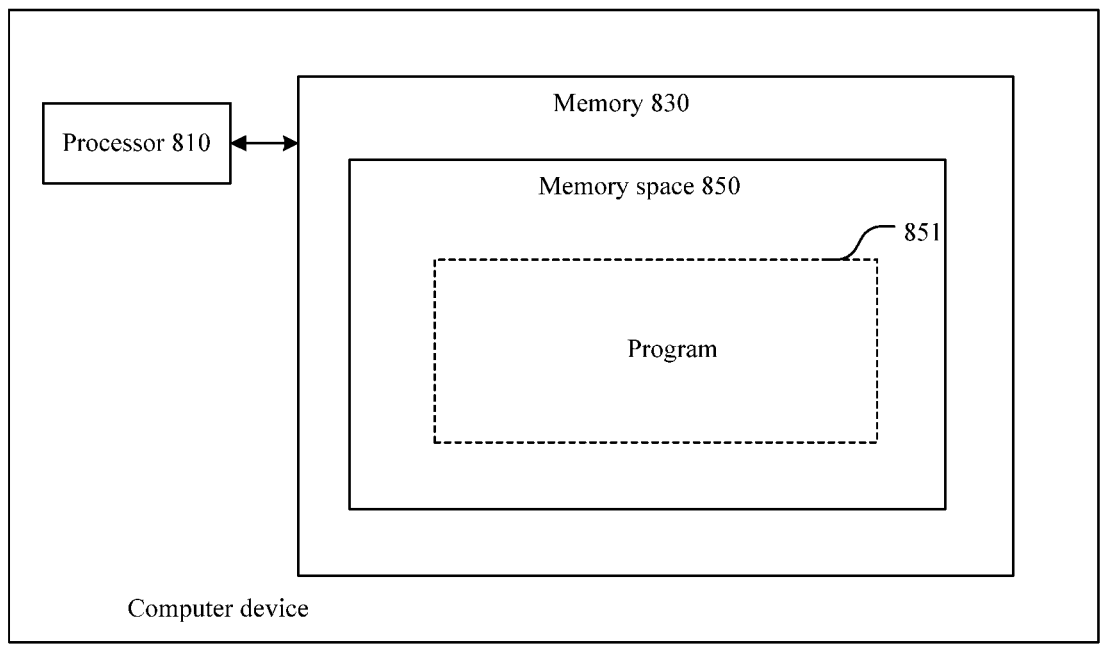
FIG. 7 illustrates a schematic structural block diagram of a computer device according to one embodiment of the present disclosure.
Figure 8:
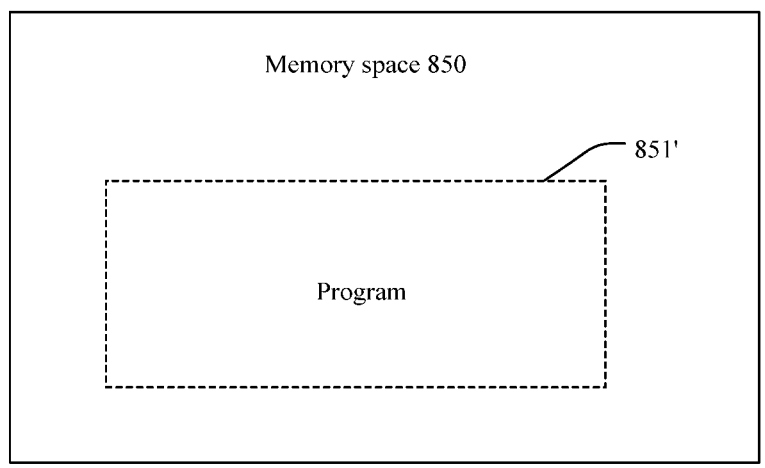
FIG. 8 illustrates a schematic diagram of a portable memory unit or a fixed memory unit for implementing a program code of the method of the present disclosure according to one embodiment of the present disclosure.

FIG. 7 illustrates a schematic structural diagram of the computer device 800 according to one embodiment of the present disclosure. The computer device 800 generally includes a processor 810 and a computer program product or computer-readable storage medium in the form of memory 830. The memory 830 may be an electronic memory such as a flash memory, an EEPROM (Electrically Erasable Programmable Read-Only Memory), an EPROM(Erasable Programmable Read-Only Memory), a hard disk, or a ROM (Read-Only Memory). The memory 830 has a storage space 850 for executing a program code 851 of any method step in the method described above, for example, the storage space 850 for the program code may include various program codes 851 for implementing the various steps in the aforesaid method, respectively. These program codes may be read out from one or more computer program products or be written into the one or more computer program products. These computer program products include a program code carrier such as a hard disk, a CD (Compact Disc), a memory card, or a floppy disk. This computer program product is generally a portable or fixed storage unit as shown in FIG. 8. The storage unit may have a storage segment, or a storage space arranged in a manner similar to that of the memory 830 in the server of FIG. 7. The program code may be compressed, for example, in an appropriate form. Generally, the storage unit includes a computer-readable code 851' (i.e., a code that can be read by a processor such as the processor 810), that, when executed by the server, causes the server to perform the various steps in the method as described above.

It should also be noted that, terms such as "comprising", "including" or any other variation are intended to cover a non-exclusive inclusion, so that a process, a method, goods, or a device which includes a series of elements not only include the elements, but also include other elements that are not expressly listed, or include the elements inherent to such process, method, goods, or device. In the condition of no further limitations, an element which is defined by a sentence "includes one . . . " does not exclude a presence of additional identical elements in the process, the method, the goods, and the device which include the elements.

The foregoing embodiments are only preferable embodiments of the present disclosure, and should not be regarded as limitations to the present disclosure. All modifications, equivalent replacements, and improvements, which are made within the spirit and the principle of the disclosure, should all be included in the protection scope of the present disclosure.

What is claimed is:

1. A method for determining a remaining range of a vehicle, performed by a computer device, comprising:
   determining a remaining range of the vehicle driven depending on a current residual energy of a power battery, determining a remaining range of the vehicle driven depending on a current residual energy of a fuel cell, and determining a remaining range of the vehicle driven depending on a recuperated energy when an energy recuperation function of the vehicle is activated; and
   determining the remaining range of the vehicle, based on the remaining range of the vehicle driven depending on the current residual energy of the power battery, the remaining range of the vehicle driven depending on the current residual energy of the fuel cell of the vehicle, and the remaining range of the vehicle driven depending on the recuperated energy when the energy recuperation function of the vehicle is activated, wherein a result of the determining of the remaining range of the vehicle is output by the computer device to a display of the vehicle or to a user, wherein said determining the remaining range of the vehicle driven depending on the current residual energy of the power battery comprises:
  obtaining a difference value between the current residual energy of the power battery of the vehicle and a reserved energy of a high-voltage electrical component of the vehicle;
  obtaining a first average vehicle speed and a first average driving power of the vehicle driven depending on the current residual energy of the power battery;
  obtaining a first consumed power of the high-voltage electrical component in a driving process of the vehicle driven depending on the current residual energy of the power battery; and
  determining the remaining range of the vehicle driven depending on the current residual energy of the power battery, based on the difference value, the first average vehicle speed, the first average driving power and the first consumed power of the high-voltage electrical component.

2. The method according to claim 1, wherein said obtaining the first average vehicle speed, the first average driving power, and the first consumed power comprises:
  obtaining a preset number of first time durations and at least one of parameters in each of the preset number of first time durations according to the first average vehicle speed and the first average driving power of the vehicle and the first consumed power of the high-voltage electrical component, wherein the parameters comprise: a vehicle moving distance, a first ratio factor reflecting a condition of allocation of driving powers of the power battery and the fuel cell, an energy consumption of a first drive motor of the vehicle, and an energy consumption of the first high-voltage electrical component;
  determining the first average vehicle speed based on the preset number of first time durations, the travel distance of the vehicle, and the first ratio factor;
  determining the first average driving power based on the preset number of first time durations, the energy consumption of the first drive motor, and the first ratio factor; and
  determining the first consumed power based on the preset number of first time durations, the energy consumption of the first high-voltage electrical component, and the first ratio factor.

3. The method according to claim 1, wherein said determining the remaining range of the vehicle driven depending on the current residual energy of the power battery comprises:
  obtaining a second ratio factor reflecting the condition of allocation of the driving powers of the power battery and the fuel cell currently; and
  determining the remaining range of the vehicle driven depending on the current residual energy of the power battery according to a formula expressed as:

$$\text{the remaining range of the vehicle driven depending on the current residual energy} = \frac{\text{the difference value} * \text{the first average vehicle speed}}{\text{the second ratio factor} * \text{the first average driving power} + \text{the first comsumed power}}.$$

4. The method according to claim 1, wherein said determining the remaining range of the vehicle driven depending on the current residual energy of the fuel cell of the vehicle comprises:
  obtaining the current residual energy of the fuel cell, wherein the current residual energy of the fuel cell is configured to be associated with a weight of a fuel of the vehicle;
  obtaining an average fuel loss of the vehicle; and
  determining the remaining range of the vehicle driven depending on the current residual energy of the fuel cell, based on the current residual energy and the average fuel loss of the vehicle.

5. The method according to claim 1, wherein said determining the remaining range of the vehicle driven depending on the recuperated energy when the energy recuperation function of the vehicle is activated comprises:
  obtaining the recuperated energy when the energy recuperation function of the vehicle is activated;
  obtaining a second average vehicle speed and a second average driving power of the vehicle driven depending on the recuperated energy when the energy recuperation function of the vehicle is activated;
  obtaining a second consumed power of the high-voltage electrical component of the vehicle in a driving process of vehicle driven depending on the recuperated energy when the energy recuperation function of the vehicle is activated; and
  determining the remaining range of the vehicle driven depending on the recuperated energy when the energy recuperation function of the vehicle is activated, based on the recuperated energy when the energy recuperation function of the vehicle is activated, the second average vehicle speed, the second average driving power and the second consumed power of the high-voltage electrical component.

6. The method according to claim 5, wherein said determining the second average driving power and the second consumed power when the energy recuperation function is activated comprises:
  obtaining a preset number of second time durations and at least one of parameters in each of the preset number of second time durations according to the second average driving power of the vehicle and the second consumed power of the high-voltage electrical component, wherein the parameters comprise: a third ratio factor reflecting a condition of allocation of driving powers of the power battery and the fuel cell, an energy consumption of a second drive motor of the vehicle, and an energy consumption of a second high-voltage electrical component;
  determining the second average driving power based on the preset number of second time durations, the energy consumption of the second drive motor, and the third ratio factor; and
  determining the second consumed power based on the preset number of second time durations, the energy consumption of the second high-voltage electrical component, and the third ratio factor.

7. The method according to claim 1, further comprising:
  obtaining a performance-related parameter of the power battery and/or the fuel cell;
  determining an attenuation rate of the power battery and/or the fuel cell when the performance-related parameter indicates that a performance of the power battery and/or the fuel cell is degraded; and determining the remaining range of the vehicle, based on the remaining range of the vehicle driven depending on the current residual energy of the power battery, the remaining range of the vehicle driven depending on the current residual energy of the fuel cell of the vehicle, the remaining range of the vehicle driven depending on the recuperated energy when the energy recuperation function of the vehicle is activated, and the attenuation rate.

8. A computer device, comprising:
a memory which stores a computer-readable program code; and
one or a plurality of processors configured to, when executing the computer-readable program code stored in the memory, implement steps of a method for determining a remaining range of a vehicle comprising:
determining a remaining range of the vehicle driven depending on a current residual energy of a power battery, determining a remaining range of the vehicle driven depending on a current residual energy of a fuel cell, and determining a remaining range of the vehicle driven depending on a recuperated energy when an energy recuperation function of the vehicle is activated; and
determining the remaining range of the vehicle, based on the remaining range of the vehicle driven depending on the current residual energy of the power battery, the remaining range of the vehicle driven depending on the current residual energy of the fuel cell of the vehicle, and the remaining range of the vehicle driven depending on the recuperated energy when the energy recuperation function of the vehicle is activated,
wherein the one or plurality of processors is further configured to perform the step of determining the remaining range of the vehicle driven depending on the current residual energy of the power battery by:
obtaining a difference value between the current residual energy of the power battery of the vehicle and a reserved energy of a high-voltage electrical component of the vehicle;
obtaining a first average vehicle speed and a first average driving power of the vehicle driven depending on the current residual energy of the power battery;
obtaining a first consumed power of the high-voltage electrical component in a driving process of the vehicle driven depending on the current residual energy of the power battery; and
determining the remaining range of the vehicle driven depending on the current residual energy of the power battery, based on the difference value, the first average vehicle speed, the first average driving power and the first consumed power of the high-voltage electrical component.

9. The computer device according to claim 8, wherein the one or plurality of processors is further configured to perform the step of obtaining the first average vehicle speed, the first average driving power, and the first consumed power by:
obtaining a preset number of first time durations and at least one of parameters in each of the preset number of first time durations according to the first average vehicle speed and the first average driving power of the vehicle and the first consumed power of the high-voltage electrical component, wherein the parameters comprise: a vehicle moving distance, a first ratio factor reflecting a condition of allocation of driving powers of the power battery and the fuel cell, an energy consumption of a first drive motor of the vehicle, and an energy consumption of the first high-voltage electrical component;
determining the first average vehicle speed based on the preset number of first time durations, the travel distance of the vehicle, and the first ratio factor;
determining the first average driving power based on the preset number of first time durations, the energy consumption of the first drive motor, and the first ratio factor; and
determining the first consumed power based on the preset number of first time durations, the energy consumption of the first high-voltage electrical component, and the first ratio factor.

10. The computer device according to claim 8, wherein the one or plurality of processors is further configured to perform the step of determining the remaining range of the vehicle driven depending on the current residual energy of the power battery by:
obtaining a second ratio factor reflecting the condition of allocation of the driving powers of the power battery and the fuel cell currently; and
determining the remaining range of the vehicle driven depending on the current residual energy of the power battery according to a formula expressed as:

$$\text{the remaining range of the vehicle driven depending on the current residual energy} = \frac{\text{the difference value} * \text{the first average vehicle speed}}{\text{the second ratio factor} * \text{the first average driving power} + \text{the first comsumed power}}.$$

11. The computer device according to claim 8, wherein the one or plurality of processors is further configured to perform the step of determining the remaining range of the vehicle driven depending on the current residual energy of the fuel cell of the vehicle by:
obtaining the current residual energy of the fuel cell, wherein the current residual energy of the fuel cell is configured to be associated with a weight of a fuel of the vehicle;
obtaining an average fuel loss of the vehicle; and
determining the remaining range of the vehicle driven depending on the current residual energy of the fuel cell, based on the current residual energy and the average fuel loss of the vehicle.

12. The computer device according to claim 8, wherein the one or plurality of processors is further configured to perform the step of determining the remaining range of the vehicle driven depending on the recuperated energy when the energy recuperation function of the vehicle is activated by:
obtaining the recuperated energy when the energy recuperation function of the vehicle is activated;
obtaining a second average vehicle speed and a second average driving power of the vehicle driven depending on the recuperated energy when the energy recuperation function of the vehicle is activated;
obtaining a second consumed power of the high-voltage electrical component of the vehicle in a driving process of vehicle driven depending on the recuperated energy when the energy recuperation function of the vehicle is activated; and determining the remaining range of the vehicle driven depending on the recuperated energy when the energy recuperation function of the vehicle is activated, based on the recuperated energy when the energy recuperation function of the vehicle is activated, the second average vehicle speed, the second average driving power and the second consumed power of the high-voltage electrical component.

13. The computer device according to claim 12, wherein the one or plurality of processors is further configured to perform the step of determining the second average driving power and the second consumed power when the energy recuperation function is activated by:

obtaining a preset number of second time durations and at least one of parameters in each of the preset number of second time durations according to the second average driving power of the vehicle and the second consumed power of the high-voltage electrical component, wherein the parameters comprise: a third ratio factor reflecting a condition of allocation of driving powers of the power battery and the fuel cell, an energy consumption of a second drive motor of the vehicle, and an energy consumption of a second high-voltage electrical component;

determining the second average driving power based on the preset number of second time durations, the energy consumption of the second drive motor, and the third ratio factor; and determining the second consumed power based on the preset number of second time durations, the energy consumption of the second high-voltage electrical component, and the third ratio factor.

14. The computer device according to claim 8, wherein the one or plurality of processors is further configured to:

obtain a performance-related parameter of the power battery and/or the fuel cell;

determine an attenuation rate of the power battery and/or the fuel cell when the performance-related parameter indicates that a performance of the power battery and/or the fuel cell is degraded; and determine the remaining range of the vehicle, based on the remaining range of the vehicle driven depending on the current residual energy of the power battery, the remaining range of the vehicle driven depending on the current residual energy of the fuel cell of the vehicle, the remaining range of the vehicle driven depending on the recuperated energy when the energy recuperation function of the vehicle is activated, and the attenuation rate.

15. A non-transitory computer-readable storage medium which stores a computer program, that, when executed by a computer device, causes the computer device to implement steps of a method for determining a remaining range of a vehicle comprising:

determining a remaining range of the vehicle driven depending on a current residual energy of a power battery, determining a remaining range of the vehicle driven depending on a current residual energy of a fuel cell, and determining a remaining range of the vehicle driven depending on a recuperated energy when an energy recuperation function of the vehicle is activated; and determining the remaining range of the vehicle, based on the remaining range of the vehicle driven depending on the current residual energy of the power battery, the remaining range of the vehicle driven depending on the current residual energy of the fuel cell of the vehicle, and the remaining range of the vehicle driven depending on the recuperated energy when the energy recuperation function of the vehicle is activated, wherein the step of determining the remaining range of the vehicle driven depending on the current residual energy of the power battery further comprises:

obtaining a difference value between the current residual energy of the power battery of the vehicle and a reserved energy of a high-voltage electrical component of the vehicle;

obtaining a first average vehicle speed and a first average driving power of the vehicle driven depending on the current residual energy of the power battery;

obtaining a first consumed power of the high-voltage electrical component in a driving process of the vehicle driven depending on the current residual energy of the power battery; and determining the remaining range of the vehicle driven depending on the current residual energy of the power battery, based on the difference value, the first average vehicle speed, the first average driving power and the first consumed power of the high-voltage electrical component.

* * * * *